Oct. 29, 1968  D. C. DOUGLASS ET AL  3,408,569
NULL BALANCE FOR pH METER
Filed Sept. 8, 1964

INVENTORS
DONALD C. DOUGLASS
JACK J. KEEGAN
BY T. E. Kristoffersen
ATTORNEY

United States Patent Office 3,408,569
Patented Oct. 29, 1968

3,408,569
NULL BALANCE FOR pH METER
Donald C. Douglass, St. Pomona, and Jack J. Keegan, Fullerton, Calif., assignors to Beckman Instruments, Inc., a corporation of California
Filed Sept. 8, 1964, Ser. No. 394,968
2 Claims. (Cl. 324—123)

ABSTRACT OF THE DISCLOSURE

A null balance circuit for a pH meter is described in which a feedback resistor is provided with a hyperbolic taper to linearize the change in instrument sensitivity with adjustment of a tap on the feedback resistor. A variable balancing tap on an associated bridge balancing network connecting a reference electrode to the feedback resistor tap may be varied, together with the sensitivity tap, to rapidly balance the instrument. An output connection removes a null meter and its characteristics from the output of the pH amplifier and simultaneously replaces it with a recorder and with a proper series recorder impedance. The recorder impedance may be mounted in a phone jack which disconnects the meter and connects the recorder.

This invention relates to a pH meter and more particularly to improvements incorporated into a pH meter having improved sensitivity.

In the area of pH instrumentation the requirements for accuracy and precision are constantly being upgraded. Until 1962, buffer solutions which are standard for pH measurement, were defined only to plus and minus .01 pH. More recently, however, the seven standard buffers have been redefined to four significant figures. This places a more stringent requirement on the measuring instrument if full advantage is to be taken of the defined scale. Improvements were in order to provide an instrument that might read a potential of a glass electrode to plus or minus .03 millivolt, which crresponds to plus or minus .0005 pH, with a relative accuracy of plus or minus .001 pH, where relative accuracy can be defined as accuracy versus the assumed standard, which in this case is a buffer chosen as a standard. Accordingly, it is an object of this invention to provide a measuring circuit for a pH meter having improved sensitivity.

It is another object of this invention to provide an improved null balance system for a pH meter incorporating a drift free amplifier, and ultralinear, full-range slide wire and a standard cell for voltage calibration.

A further object of this invention is to provide such a system with a sensitivity control capable of speeding up the balancing or nulling of the system.

A still further object of the invention is to provide such a system incorporating a recorder adapter capable of removing the null meter from the circuit when the recorder is plugged in.

In carrying out the invention in one form thereof, a high gain amplifier is connected in series circuit with a null meter and a feedback resistor to a reference potential. A reference electrode is connected through a balanced bridge network to a tap on the feedback resistor which may be varied to modify the amount of feedback and resulting sensitivity of the circuit. A glass electrode is connected to the input of the amplifier.

A recorder jack may be connected so as to remove the null meter from the circuit when the recorder is connected between the output of the amplifier and the feedback resistor.

Figure 1:
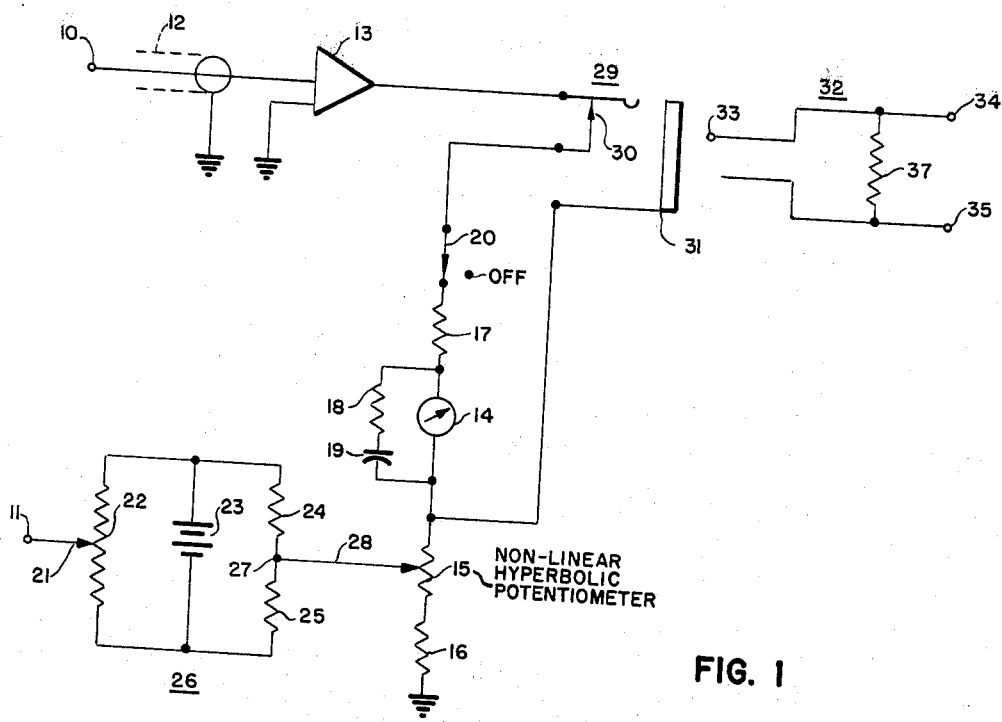
Figure 2:
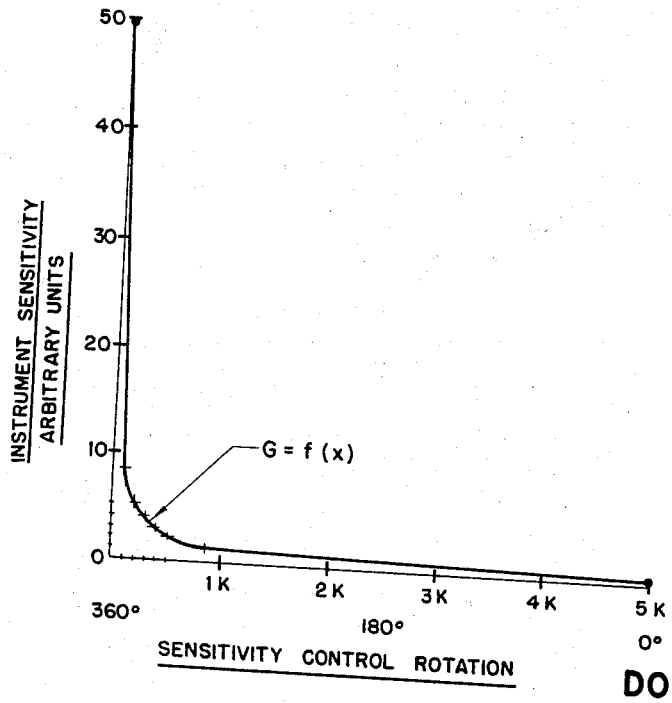

The novel features which are believed to be characteristic of the invention are set forth with particularity in the appended claims. The invention itself, however, together with further objects and advantages thereof can best be understood by reference to the following description taken in connection with the accompanying drawings in which:

FIG. 1 is a block circuit diagram of a pH meter in accordance with the invention; and FIG. 2 is a graph of instrument sensitivity versus the impedance of the variable feedback resistor correlated with the degrees of rotation thereof.

Referring to FIG. 1, a pair of input terminals 10 and 11 are adapted for connection to a glass electrode and a reference electrode, respectively. Terminal 10 is connected by way of a shielded cable 12 to one input of an amplifier 13, the other input of which is connected to a reference potential which may be circuit ground. This amplifier 13 is a high gain, negative feedback type. All components with the exception of the input electrometer are solid state. A synchronous chopper is used to modulate the input signal. Amplification is carried out on a resultant AC signal which is then converted back to DC for readout. The use of a chopper and AC amplification virtually eliminates drift. This feature is essential in precision measurements since amplifier drift between calibration and measurement will appear as an error in the final results. Such an amplifier may be obtained from Beckman Instruments, Inc., 2500 Harbor Boulevard, Fullerton, Calif., under the designation part number 73050, Model 76 pH Meter Amplifier.

The output of amplifier 13 is connected through a null meter 14 and a feedback resistor 15 and fixed resistor 16 to the reference potential. Null meter 14 may also have an associated series resistor 17 and a parallel circuit comprising a resistor 18 and capacitor 19, as is well-known in the art. A switch 20 may be used for switching the null meter 14 in and out of circuit.

The reference electrode terminal 11 is connected to a variable contact 21 on a slide wire 22 which may be, for example, a custom built 15 turn potentiometer with a linearity of .01 percent over any three runs and an overall linearity of .025 percent. The length of the slide wire may be nearly 12 feet, making it possible to place the full scale of —.5 to 14.5 pH on a single readout dial with high resolution and accuracy. The slide wire is sealed and permanently lubricated. The voltage across the slide wire is supplied by two mercury batteries 23. Such a slide wire may be obtained from Beckman Instruments, Inc., under the designation 15 turn Model B Ultra Linear Potentiometer. Two fixed resistors 24 and 25 are connected across the slide wire and battery, as indicated, to form the bridge balance network generally indicated as 26. The terminal 27 between resistors 24 and 25 is connected to the variable tap 28 on feedback resistor 15.

The amplifier 13 serves to make the voltage across that portion of resistance 15 below tap 28 and resistance 16 equal to the input voltage across terminals 10 and 11. Therefore, only when the voltage on the slide wire exactly opposes the input voltage will the null meter 14 read zero. The sensitivity control tap 28 serves to adjust the amount of feedback to amplifier 13. As tap 28 is adjusted downward, the portion of the output signal fed back is decreased, increasing the sensitivity of the circuit. A standard cell (not illustrated) may be substituted for the input signals to calibrate the circuit.

Since the amplifier 13 is of high gain, and is included in a potentiometric circuit having negative feedback design, it will not lose appreciable linearity or input characteristics of null. Therefore, the pH meter may be used as a direct reading instrument. The amplifier mentioned above has a maximum output of 200 microamperes which can be used to drive the meter 14 using appropriate current limiting and damping components 17, 18 and 19.

Referring to FIG. 2, which is the graph of the instrument sensitivity versus the impedance of the variable feedback resistor correlated with the degrees of rotation thereof, the instrument sensitivity may be defined as $$G = \frac{1}{\beta}$$

Where $$\beta = \frac{20+X}{K}$$

with X varying between zero and 5000. Where X is the value of the impedance of that portion of the variable feedback impedance below the tap 28 and the constant 20 is the number of ohms for a typical value of impedance 16. K is a circuit constant related to amplifier gain. Therefore, the instrument sensitivity $$G = \frac{K}{20+X}$$

where X varies between zero and 5000 and has been plotted in FIG. 2. It can be seen that the sensitivity variation is very small between 5000 ohms and 1000 ohms and then turns rapidly upward, the curve taking the general form of a hyperbola. The curve of FIG. 2 was taken using a variable feedback resistor having a linear taper. To compensate for this and to make the variations in the instrument sensitivity linear with angular variation in the sensitivity control a potentiometer having a special taper characteristic which is hyperbolic in nature and substantially the reciprocal of that illustrated in the curve of FIG. 2 was provided as feedback resistor 15.

In nulling the instrument, the operator starts with minimum sensitivity with tap 28 at the top. At this time the entire pH spectrum of zero to 14 pH is displayed on the meter scale and the approximate pH value yields the rough steering information. The instrument is then nulled and when null is approached the tap 28 is moved down increasing the sensitivity of the circuit. This is repeated by adjusting the two taps 21 and 28 in turn or even simultaneously until the tap 28 reaches its lower extremity or maximum instrument sensitivity at which point the tap 21 is varied slowly until the final null. In this condition the full scale of the null meter may be, for example, less than a 0.1 pH.

A recorder adapter 29 is connected with its normally closed contacts 30 making the series connection between the output of amplifier 13 and switch 20. The external terminal 31 of adapter 29 is connected to the point between null meter 14 and resistor 15. A mating connector 32 for recording adapter 29 has one input terminal 33 which, when connector 32 is inserted in adapter 29, will serve to break normally closed contacts 30 and make a connection directly from the output of amplifier 13 to terminal 34 to which one side of the recorder is connected. The other side of the recorder is connected to terminal 35 which is connected in turn to that portion of connector 32 which makes contact with the external terminal 31 of adapter 29 when connector 32 is inserted into adapter 29. Series recorder resistor 37 is connected across terminals 34 and 35.

The purpose of the adapter 29 and its associated connector 32, which will remove the null meter 14 from the circuit when the recorder is coupled thereto, is that the meter damping network and needle ballistic characteristics react with the recorder dynamics causing undesirable oscillations when both are connected in circuit at the same time. A residual charge on large damping network capacitors has further caused potentiometer recorders to develop a potential offset. Also, since the output meter 14 is a null indicator and limited in current capacity, a normal series recorder resistor such as 37 if connected either in series or parallel with the null meter will develop a small potential which limits the required instrument sensitivity. Removal of the meter 14 enables the recorder to utilize the full current capabilities of the amplifier 13 and is compatible with a large range of recorder sensitivities. Typical input sensitivities, recorder sensitivities and values for the resistor 37 are given in the following table:

| Input Sensitivity, pH | Recorder Sensitivity, mv. | Value of 37 in ohms |
|---|---|---|
| ±.05 to ±7.0 | 1 | 10 |
|  | 5 | 50 |
|  | 10 | 100 |
|  | 50 | 500 |
|  | 100 | 1,000 |

While a particular embodiment of the invention has been illustrated and described, it should be understood that the invention is not limited thereto, and that it is intended by the appended claims to cover all variations that fall within the true spirit and scope of the invention.

What is claimed as new and desired to be secured by Letters Patent of the United States is:

1. A pH meter comprising; a high gain amplifier having, a first input terminal adapted for connection to a sensing electrode of a pH cell, a first output terminal, a second input terminal and a second output terminal both adapted to be connected to a reference potential; a null meter; a potentiometer having, a first potentiometer terminal, a second potentiometer terminal, and an angularly adjustable variable sensitivity tap, said potentiometer having a hyperbolic relationship between the angular position of the tap and the value of resistance between the tap and the first potentiometer terminal; means coupling the null meter between the first output terminal and the first potentiometer terminal; means coupling the second potentiometer terminal to the reference potential; a balance network including, a source of potential, a first balance impedance having a variable tap adapted to be connected to a reference electrode of the pH cell, said first balance impedance being connected across the source of potential, and a second balance impedance having a fixed intermediate tap, said second balance impedance being connected across the source of potential; means connecting the fixed tap on the balance network to said variable sensitivity tap; whereby a negative feedback path is established from the variable sensitivity tap through the balance network and pH cell to the first input terminal of the amplifier.

2. The combination of claim 1 including adapter and connector means wherein said adapter comprises the female portion of a normally closed three-terminal, two-conductor phone jack having its normally closed terminals connected to said first output terminal and null meter and its open terminal connected between said null meter and the first terminal of said potentiometer, and said connector comprises the male portion of said jack having a series recorder impedance connected across its contacts and adapted to be connected across a recorder, said recorder being adapted to disconnect said normally closed terminals upon insertion of the jack whereby the appropriate sensitivity for the recorder is established and the meter ballistics and damping do not affect recording.

References Cited
UNITED STATES PATENTS

| | | | |
|---|---|---|---|
| 2,108,293 | 2/1938 | Perley | 324—30 X |
| 2,232,211 | 2/1941 | Cary | 324—123 X |
| 2,340,641 | 2/1944 | Cameron | 324—30 |
| 2,768,234 | 10/1956 | Popp | 200—51.1 X |
| 3,281,684 | 10/1966 | Reeds | 324—98 |

(Other references on following page)

OTHER REFERENCES

Lewin, S. Z.: "Chemical Instrumentation" Journal of Chemical Education, vol. 37, No. 2, February, 1960, pp. A65 and A66.

Thordarson Transmitter Guide: No. 344-E; 1940, pp. 12 and 13.

Lewin, S. Z.: "Chemical Instrumentation", Journal of Chemical Education, vol. 36, No. 11, November, 1959, pp. A670 and A672.

RUDOLPH V. ROLINEC, *Primary Examiner.*

E. F. KARLSEN, *Assistant Examiner.*